(12) United States Patent
Abe

(10) Patent No.: US 7,352,480 B2
(45) Date of Patent: Apr. 1, 2008

(54) IMAGE PROCESSING APPARATUS AND IMAGE PROCESSING METHOD

(75) Inventor: Yoshinori Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 10/393,463

(22) Filed: Mar. 21, 2003

(65) Prior Publication Data

US 2003/0179419 A1 Sep. 25, 2003

(30) Foreign Application Priority Data

Mar. 22, 2002 (JP) ............................. 2002-080686

(51) Int. Cl.
*G06F 3/12* (2006.01)
(52) U.S. Cl. ................... 358/1.13; 358/1.14; 358/1.15; 358/296; 347/249; 347/250; 347/235; 710/52
(58) Field of Classification Search .............. 358/1.13, 358/1.14, 1.15, 296; 347/249, 250, 235; 710/52
See application file for complete search history.

(56) References Cited

U.S. PATENT DOCUMENTS

| | | | | |
|---|---|---|---|---|
| 5,745,154 A | * | 4/1998 | Nishizawa | 347/250 |
| 5,933,266 A | * | 8/1999 | Minakuchi | 359/196 |
| 5,960,458 A | * | 9/1999 | Kametani | 711/147 |
| 6,161,168 A | * | 12/2000 | Kametani | 711/147 |
| 6,262,759 B1 | * | 7/2001 | Akiyama et al. | 347/250 |
| 6,512,534 B2 | * | 1/2003 | Koga | 347/249 |
| 6,775,040 B2 | * | 8/2004 | Hori | 359/202 |
| 6,900,906 B1 | * | 5/2005 | Tanaka | 358/1.16 |
| 6,952,276 B2 | * | 10/2005 | Sotokawa et al. | 358/1.15 |
| 7,062,664 B2 | * | 6/2006 | Date et al. | 713/320 |

FOREIGN PATENT DOCUMENTS

| | | |
|---|---|---|
| JP | 01-118946 | 5/1989 |
| JP | 02-182076 | 7/1990 |
| JP | 07-040600 | 2/1995 |
| JP | 09-160840 | 6/1997 |

* cited by examiner

*Primary Examiner*—Twyler Haskins
*Assistant Examiner*—Jacky X. Xheng
(74) *Attorney, Agent, or Firm*—Fitzpatrick, Cella, Harper & Scinto

(57) ABSTRACT

An image processing apparatus which comprises a RAM acting as a shared memory for storing image data, and an image processing board, connected to the RAM through a PCI bus acting as a general-purpose bus, for performing raster conversion to the image data and performing a necessary image process to the converted data by using a line memory is provided. In this apparatus, in a case where the image processing board can not input or output the data from or to the PCI bus, it is controlled not to generate a sync signal used for a process in the image processing board, whereby a stable operation is possible in an image forming apparatus and an image processing method which include the image processing apparatus.

2 Claims, 14 Drawing Sheets

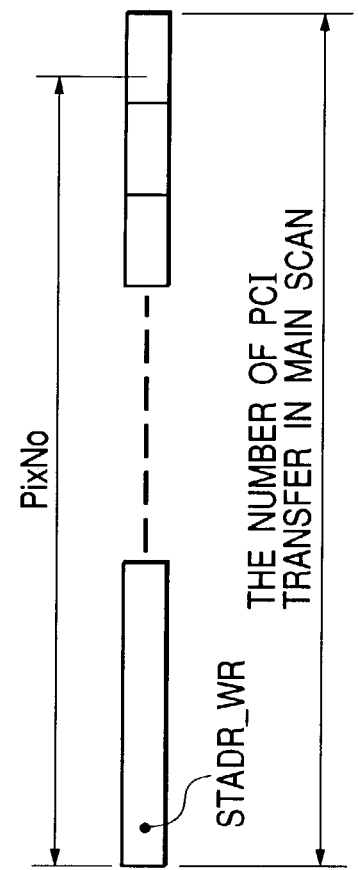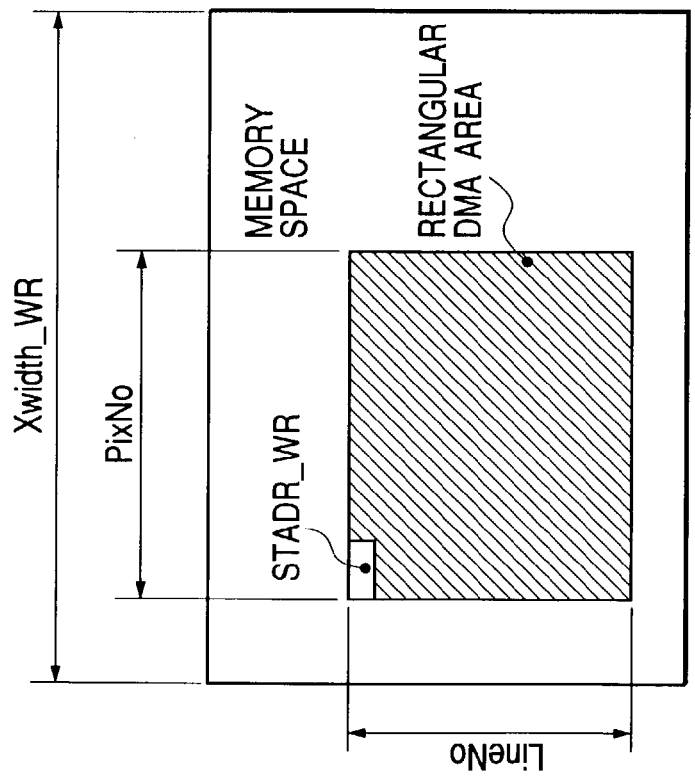
FIG. 11A
FIG. 11B

IMAGE PROCESSING APPARATUS AND IMAGE PROCESSING METHOD

BACKGROUND OF THE INVENTION

1. Field of the Invention

The present invention relates to an image processing apparatus, and more particularly to control of an image processing unit (board) which is connected to a general-purpose bus such as a PCI (Peripheral Component Interconnect) bus or the like.

2. Related Background Art

Conventionally, a digital copying machine which has functions to read an original being a copy target, store image data representing the read original in a storage such as a hard disk or the like, and then output the stored image data to other printer through a network is known. That is, since the digital copying machine of such a type has the plural functions which includes a print function to input print data from an external computer and print the input print data, a facsimile reception function to receive facsimile data from a public network, and the like, it is called a multifunctional apparatus.

Furthermore, since the multifunctional apparatus is equipped with a general-purpose bus such as a PCI bus or the like, plural image processing boards such as an image magnification change processing board and the like can be connected to the multifunctional apparatus according to a user's demand.

However, when such a system to add the image processing board to the multifunctional apparatus through the PCI bus is adopted, the multifunctional apparatus becomes expandable. However, since the general-purpose bus is time-divisionally used, it is necessary to provide many image memories (page memories) on each image processing board so that the process is not interrupted on the way. As a result, this increases the cost of an entire system.

Incidentally, if data from the PCI bus and its timing are subjected to raster conversion, the converted data can be processed only by a line memory such as an FIFO (first-in, first-out) memory or the like. However, even in such a case, if the PCI bus is occupied by other image processing board, the data can not be input from the bus, and also processed image data can not be output to the bus. Therefore, a problem that the data is lost because the line memory such as the FIFO memory overflows occurs, whereby such a system does not necessarily have stability.

SUMMARY OF THE INVENTION

The present invention has been completed under such a situation. Then, an object of the present invention is to provide an image forming apparatus which is equipped with an image processing unit, connected to a general-purpose bus such as a PCI bus or the like, for performing a necessary image process by using a line memory, and which can perform a stable operation, and the object is further to provide an image forming method which is applicable to the image forming apparatus.

In order to achieve the above object, the present invention is characterized by image processing apparatuses (1) and (2) and image processing methods (3) and (4), as follows.

(1) The image processing apparatus which comprises: a shared memory for storing image data; an image processing unit, connected to the shared memory through a general-purpose bus, for performing raster conversion to the image data and performing a necessary image process to the converted data by using a line memory; and a control means for performing, in a case where the image processing unit can not input or output the data from or to the general-purpose bus, control so as not to generate a sync signal used for a process in the image processing unit.

(2) The image processing apparatus which is premised on the above apparatus of (1), in which the control means measures a period of time that the sync signal for the image processing unit is not generated, and outputs an error signal concerning the general-purpose bus if the measured period of time exceeds a predetermined period of time.

(3) The image processing method in an image processing apparatus which comprises a shared memory for storing image data, and an image processing unit, connected to the shared memory through a general-purpose bus, for performing raster conversion to the image data and performing a necessary image process to the converted data by using a line memory, comprises a control step of performing, in a case where the image processing unit can not input or output the data from or to the general-purpose bus, control so as not to generate a sync signal used for a process in the image processing unit.

(4) The image processing method which is premised on the above method of (3), in which a period of time that the sync signal for the image processing unit is not generated is measured, and an error signal concerning the general-purpose bus is output in a case where the measured period of time exceeds a predetermined period of time.

Other object and the feature of the present invention will be apparent from the following embodiments.

BRIEF DESCRIPTION OF THE DRAWINGS

FIGS. 11A and 11B are diagrams showing a memory state after the process in the rectangular DMA transfer;

DETAILED DESCRIPTION OF THE PREFERRED EMBODIMENTS

Hereinafter, an image processing apparatus according to the embodiment of the present invention will be explained in more detail.

Figure 1:
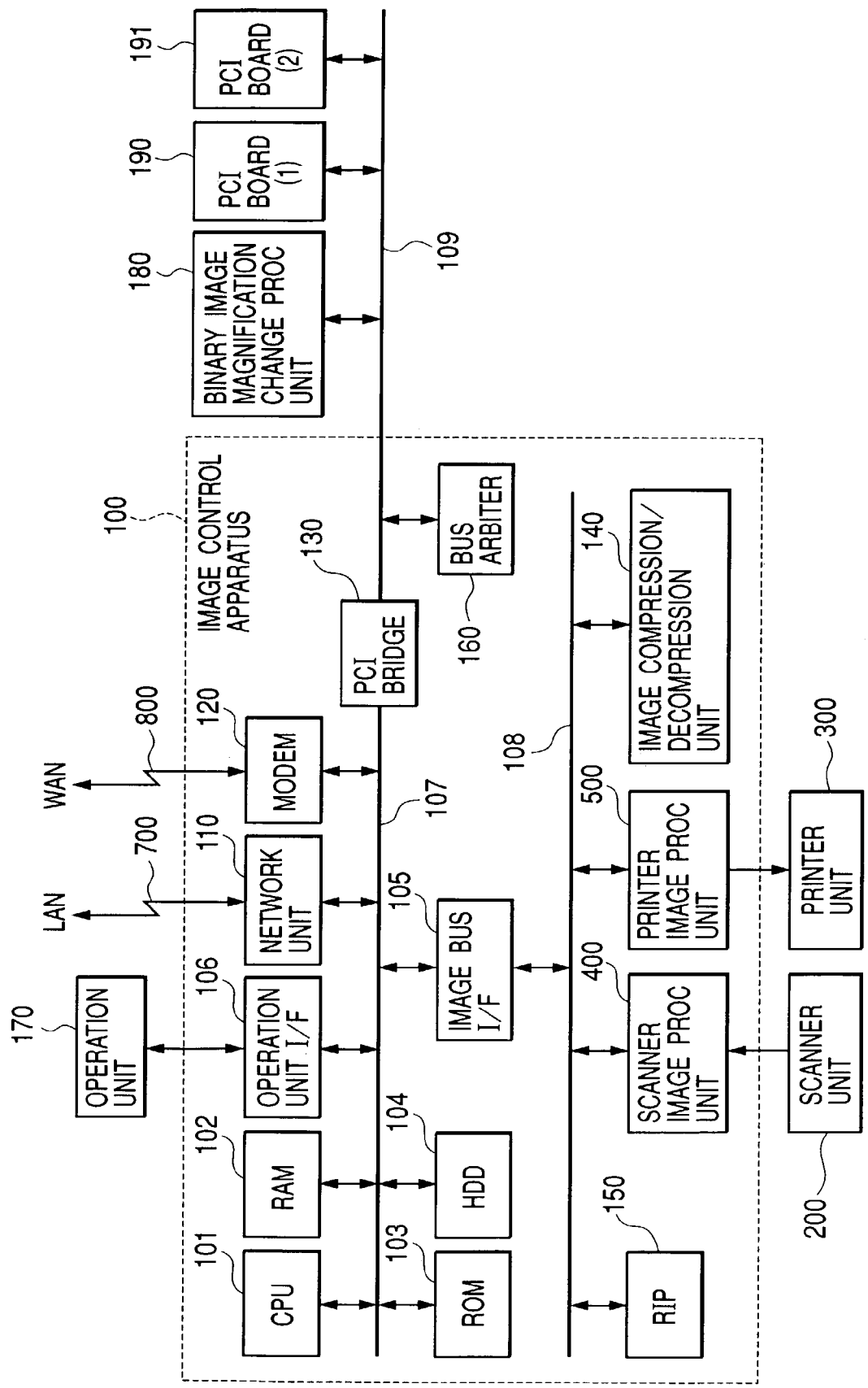
FIG. 1 is a block diagram showing the structure of an image processing apparatus according to the embodiment of the present invention.

FIG. 1 is a block diagram showing the structure of the image processing apparatus according to the embodiment of the present invention. As shown in FIG. 1, the image processing apparatus consists of an image control apparatus, an image processing board which is connected to a PCI bus acting as a standard bus and performs a binary image magnification conversion process or the like, and a PCI board which performs other process.

In FIG. 1, an image control apparatus 100 is connected to a scanner unit 200 which acts as an image input device and a printer unit 300 which acts as an image output device, and is on the other hand connected to a LAN 700 and a public network (wide area network (WAN)) 800. Thus, the image control apparatus 100 acts as a controller which inputs and outputs image information, device information and the like.

It should be noted that the image control apparatus 100 is provided in a multifunctional digital copying machine, or a multifunctional apparatus which includes the scanner unit 200 and the printer unit 300 and is called a next-generation copying machine or the like.

In the image control apparatus 100, a CPU 101 is a controller which controls an entire system, and a RAM 102 is a system working memory which is used when the CPU 101 operates. Also, the RAM 102 acts as a shared memory which is used as an image memory to temporarily store image data. A ROM 103 is a boot ROM in which a boot program for the system has been stored previously, and a hard disk drive (HDD) 104 is a hard disk in which system software, image data, function information for the image output device, and the like are stored. An operation unit interface (I/F) 106 is an interface with an operation unit (user interface (UI)) 170, whereby image data to be displayed is output to the operation unit 170 through the operation unit I/F 106, and also information input by a user of the system is transferred from the operation unit 170 to the CPU 101 through the operation unit I/F 106. A network unit 110 which is connected to the LAN 700 inputs and outputs various information, and also a modem 120 which is connected to the public network 800 inputs and outputs various information. Here, it should be noted that the above devices are disposed on a system bus 107.

An image bus I/F 105 is a but bridge which is connected to an image bus 108 for transferring image data to and from the system bus 107 at high speed and also converts a data structure suitable for the connected bus. Here, it should be noted that the image bus 108 is structured as the high-speed bus by which the image data can be accessed at high speed as compared with the system bus 107. Here, a raster image processor (RIP) 150, a scanner image processing unit 400, a printer image processing unit 500 and an image compression/decompression unit 140 are disposed on the image bus 108. The RIP 150 expands a PDL (page-description language) code into a bitmap image, and the scanner image processing unit 400 corrects, processes and edits image data input from the scanner unit 200. For example, in the scanner image processing unit 400, a spatial filter process to correct a modulation transfer function (FTF) of the image data of the scanner unit 200, a multivalued magnification change process to enlarge and reduce an image in a copying operation, a table conversion process to convert image data being brightness data read by the scanner unit 200 into density data, an error diffusion process of multivalued image data, a screen process, a binarization process and the like are performed, and the processed data is then transferred to the image bus 108.

Furthermore, in the editing process, a closed area surrounded by a marker-pen line written on an original to be copied is first recognized, and the image process including shadowing, hatching (screening), negative/positive inverting and the like is performed to the image data within the closed area. The printer image processing unit 500 performs a smoothing process or the like to smoothen the edge of a character represented by print output image data, and then outputs the processed data to the printer unit 300. Here, it should be noted that the smoothing process is the process to smoothen a jaggy of the image (i.e., coarseness such as hatched lines or the like appearing in white/black boundary portion on the image) represented by the binarized image data. The image compression/decompression unit 140 performs various compression/decompression processes such as a JPEG (Joint Photographic Experts Group) process for the multivalued image data, and JBIC (Joint Bi-level Image experts Group), MMR (Modified Modified READ) and MH (Modified Huffman) processes for the binary image data. A PCT bridge 130 is a bus bridge which is used to convert data between the system bus 107 and a later-described PCI bus 109, and a bus arbiter 160 performs bus arbitration for PCI devices connected to the PCI bus 109.

The PCI bus 109 is a sync bus in which all signal lines handle 32-bit signals synchronous with a PCI clock. On the PCI bus 109, address data and other data are time-divisionally transferred (i.e., multiplexed) by using the same signal line. In particular, the PCI bus can achieve burst transfer to first designate the address and then continuously transfer the data, whereby the image data and the like can be transferred at high speed.

A binary image magnification change processing unit (or binary image magnification change board) 180 is a processing module which characterizes the present invention, and the detailed contents thereof will be described later. Basically, the binary image magnification change processing unit 180 is an image magnification change means which receives input binary image data, performs a magnification change process to the received data, and then outputs again the processed binary image data. A PCI board (1) 190 and a PCI board (2) 191 are boards which are connected to the PCI bus 109 and act as an accelerator for the CPU 101, other image processing boards, and the like. These boards are connected to the image control apparatus 100 through a connector, according to need.

Figure 2:
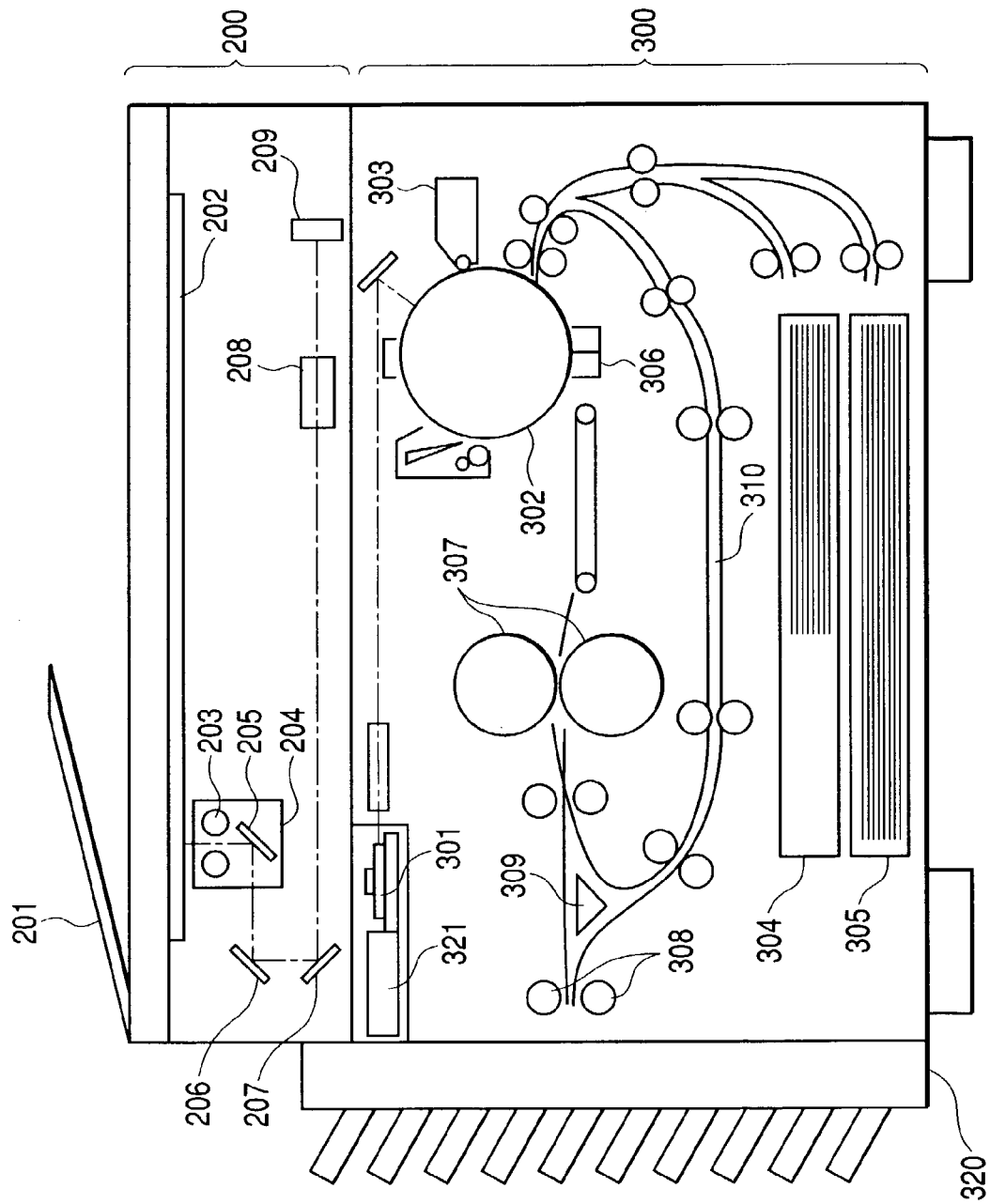
FIG. 2 is a sectional diagram showing a scanner unit and a printer unit according to the embodiment.

FIG. 2 is a sectional diagram showing the scanner unit 200 and the printer unit 300 which together constitute the multifunctional apparatus. In FIG. 2, a document feeder 201 of the scanner unit 200 feeds and transports originals, from the last page thereof, onto a platen glass 202 one by one in due order, and then discharges the originals from the platen glass 202 after an original reading operation ended. On one hand, when the original is transported on the platen glass 202, a lamp 203 is turned on, and movement or shift of a scanner unit 204 is started, whereby the original is exposed and scanned. Then, reflection light from the original is guided into a CCD image sensor (simply called a CCD hereinafter) 209 through mirrors 205, 206 and 207 and a lens 208, whereby the scanned image on the original is read by the CCD 209. After then, image data output from the CCD 209 is subjected to a predetermined process by the scanner image processing unit 400. On one hand, a laser driver 321 of the printer unit 300 drives and causes a laser beam generation unit 301 to generate a laser beam according to image data processed by the printer image processing unit 500, and the generated laser beam is irradiated onto a photosensitive drum 302, whereby a latent image according to the irradiated laser beam is formed on the photosensitive drum 302. Then, a developer is adhered to the portion corresponding to the latent image on the photosensitive drum 302 by a developing unit 303, and a recording paper is fed from either a cassette 304 or 305 at timing synchronous with the irradiation of the laser beam and further transported to a transfer unit 306, whereby the developer adhered on the photosensitive drum 302 is transferred to the recording paper. Subsequently, the recording paper on which the developer has been adhered is transported to a fixing unit 307, and the developer is fixed to the recording paper by heat and pressure of the fixing unit 307. The recording papers passed the fixing unit 307 are discharged by discharge rollers 308, and the discharged recording papers are sorted and held in respective bins by a sorter 320. Here, it is assumed that the discharged recording papers are held in the uppermost bin if any sorting mode is not set for the sorter 320. Incidentally, in a case where a double-sided recording mode is set, after the recording paper was once transported up to the discharge rollers 308, the rotation direction of each of the discharge rollers 308 is reversed, and the recording paper is guided into a paper re-transportation path 310 by a flapper 309. Furthermore, in a case where a multi-recording mode is set, the recording paper is guided to the paper re-transportation path 310 by the flapper 309 so that the recording paper does not reach the discharge rollers 308, and the recording paper is then transported to the transfer unit 306 at the above-described timing.

Incidentally, since the multifunctional apparatus according to the embodiment is equipped with the HDD 104 capable of large-capacity image data, it is possible to achieve a sort function to once store the image data read by the scanner unit 200 and/or the data obtained by expanding PDL data with the RIP 150, change the order of stored data, and then read the order-changed data from the HDD 104. In this case, each bin of the sorter 320 can be used as a mail box for an independent user who performs image printing.

Next, an operation flow of the function board (particularly, binary image magnification change processing unit 180) using the PCI bus will be explained.

The image data read by the scanner unit 200 is subjected to the predetermined image process and converted into the binary image data by the scanner image processing unit 400, and the obtained binary image data is transferred to the image bus 108. The binary image data is compressed in the JBIG process by the image compression/decompression unit 140, the compressed image data is transferred on the system bus 107 through the image bus 108 and the image bus I/F 105, and the transferred image data is stored in the HDD 104.

Similarly, if the data input from the LAN 700 is compressed image data, it is stored in the HDD 104 through the network unit 110, while if the input data is uncompressed image data, it is once compressed by the image compression/decompression unit 140 and then stored in the HDD 104. In a case where the image data stored in the HDD 104 is printed or subjected to the binary image data magnification change process, the compressed image data read from the HDD 104 is once decompressed by the image compression/decompression unit 140 and then written in the RAM 102. If the image data written in the RAM 102 is printed, the smoothing process is performed to the image data by the printer image processing unit 500 so as to smoothen the edge of the image, and then the processed image data is output by the printer unit 300.

Furthermore, when the binary image data magnification change process is performed by the binary image magnification change processing unit 180, the image data stored in the RAM 102 acting as the shared memory in the system is subjected to timing conversion by the PCI bridge 130 through the system bus 107, and the processed data is transferred on the PCI bus 109. In this case, the bus arbitration is performed for the PCI bus 109 by the bus arbiter 160 so that the PCI boards 190 and 191 do not compete with the binary image magnification change processing unit 180.

Then, the binary image magnification change processing unit 180 connected to the PCI bus 109 performs the magnification change process to the image data at a predetermined magnifying power, and the processed data is written in the RAM 102 through the PCI bus 109, the PCI bridge 130 and the system bus 107. The image data written in the RAM 102 is processed by the printer image processing unit 500 and then printed by the printer unit 300. As above, when the process is performed in real time by the printer unit 300 or the scanner unit 200, the image data is once written in the RAM 102 in the uncompressed state, and then the stored data is subjected to the binary image data magnification change process, the printing of the printer unit 300, or the like.

Figure 3:
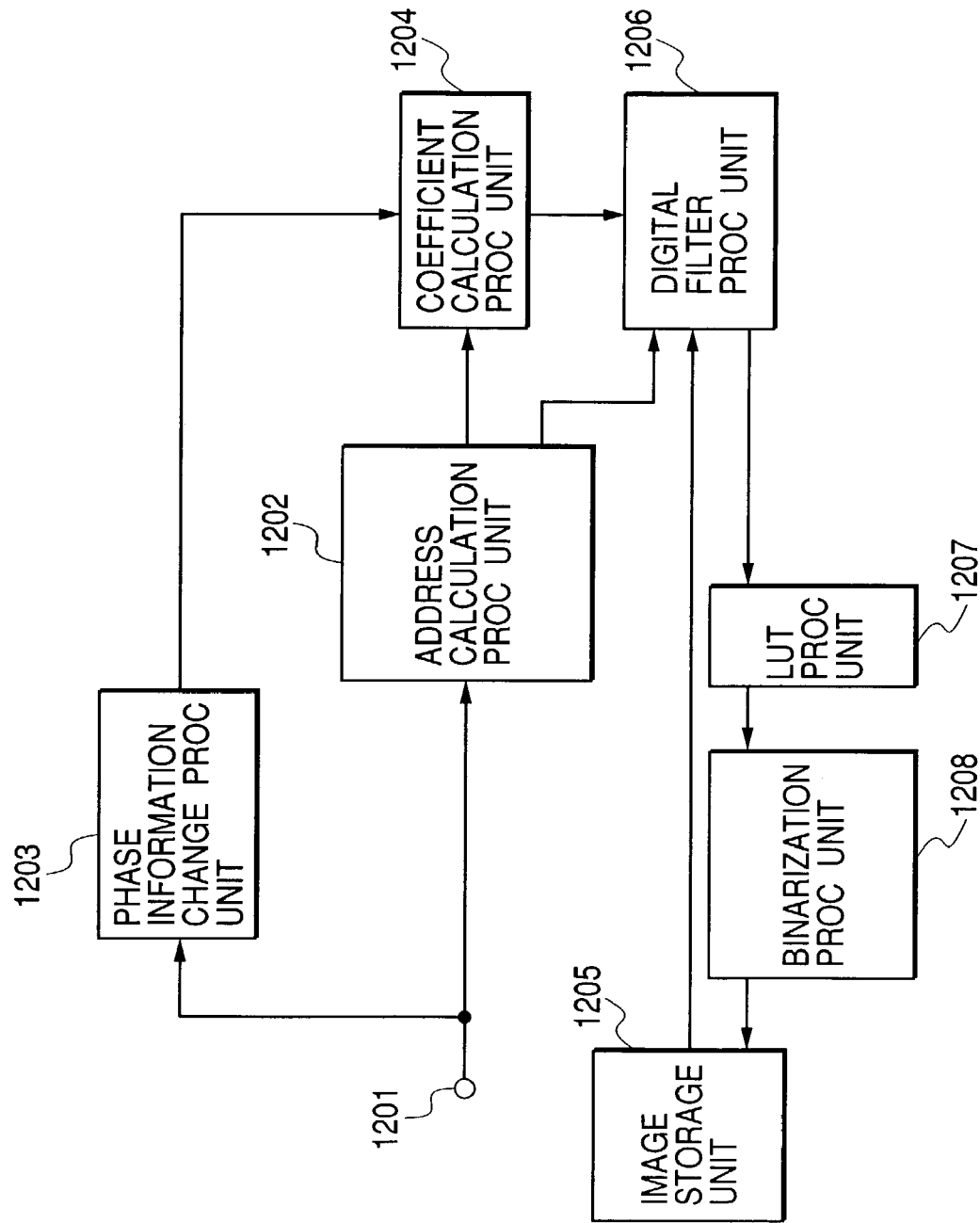
FIG. 3 is a block diagram showing a principle of binary image magnification change.

Hereinafter, the principle of the binary image data magnification change process will be explained with reference to FIGS. 3 and 4. In the binary image data magnification change process, an actual calculation process is performed by means of hardware to increase processing speed, but the concrete circuit structure of the hardware will be described later.

Incidentally, as the image magnification change process, it is known a process according to a nearest neighbor method in which a pixel of former image data nearest to a target pixel to which the magnification change has been performed is selected. However, since merely the nearest pixel data is used in this method, the image obtained by the process in this method seriously deteriorates. More specifically, a moiré occurs in the obtained image, the enlarged pixel is coarsely seen, and the like. In consideration of this, the binary image magnification change process according to the embodiment includes a magnification change process capable of controlling a characteristic of a low-pass filter according to a set magnifying power, whereby a magnification-changed (i.e., enlarged or reduced) image in which occurrence of a periodic striped pattern such as the moiré or the like can be controlled is obtained without unnecessarily lowering resolution. Furthermore, in this process, the binary image is input and converted into the multivalued image, and further the converted multivalued image is continuously converted into the binary image, whereby the binary image is resultingly output. Therefore, an image data storage capacity and an image data transfer amount can be both made minimum.

The structure and operation of the magnification change processing unit which controls the characteristic of the low-pass filter according to the magnifying power will be explained with reference to FIG. 3. In FIG. 3, numeral 1201 denotes a magnifying power input unit, numeral 1202 denotes an address calculation processing unit, numeral 1203 denotes a phase information change processing unit, numeral 1204 denotes a coefficient calculation processing unit, numeral 1206 denotes a digital filter processing unit, numeral 1207 denotes a look-up table (LUT) processing unit, and numeral 1208 denotes a binarization processing unit. Furthermore, numeral 1205 denotes an image storage unit which is equivalent to the RAM 102 shown in FIG. 1. In the magnification change processing unit, first, a magnifying power is input from the magnifying power input unit 1201, that is, the CPU 101 shown in FIG. 1.

The phase information change processing unit (phase information change means) 1203 which accepted the magnifying power outputs a phase information control parameter according to the accepted magnifying power, and also outputs an initial phase parameter to the address calculation processing unit 1202 according to the accepted magnifying power.

The address calculation processing unit 1202 which received the magnifying power and the initial phase parameter performs address calculation while shifting the pixel position of the output image in regard to each pixel. More specifically, it is calculated based on the magnifying power to which pixel position on the former image the target pixel on the output image corresponds, phase information is output to the coefficient calculation processing unit 1204, and pixel position information of the former image is output to the digital filter processing unit 1206.

The coefficient calculation processing unit 1204 to which the phase information and a phase information control parameter have been input calculates a distance between the target pixel and each of the former-image 8×8 pixels positioned in the vicinity of the target pixel, and calculates a filter coefficient to be used for a filter in accordance with the calculated distance and the phase information control parameter. After then, the coefficient of each pixel is set to the digital filter processing unit 1206.

The image data is input from the image storage unit 1205 to the digital filter processing unit 1206. The one-bit image data stored in the image storage unit 1205 (RAM 102 in FIG. 1) is pseudo-converted into eight-bit image data before it is input in the digital filter processing unit 1206.

On the basis of the pixel position information sent from the address calculation processing unit 1202, the digital filter processing unit 1206 receives from the image storage unit 1205 the data of the former-image 8×8 pixels to be filter-processed, performs convolution calculation based on the filter coefficient, and then outputs multivalued image data. The LUT processing unit 1207 receives the output multivalued image data, and outputs an output value according to a level by referring to a table. The binarization processing unit 1208 binarizes the output result from the LUT processing unit 1207, and outputs the obtained binary image data to the image storage unit 1205. As a result, by such a principle as above, the binarization processing unit 1208 receives the binary image data, performs the magnification change to the input data, and again outputs the binary image data. In the embodiment, since the binarization processing unit 1208 outputs the binary image data without spooling the multivalued image data under the intermediate process, the used capacity of the image storage unit 1205 and the image data transfer amount can be both made minimum.

Figure 4:
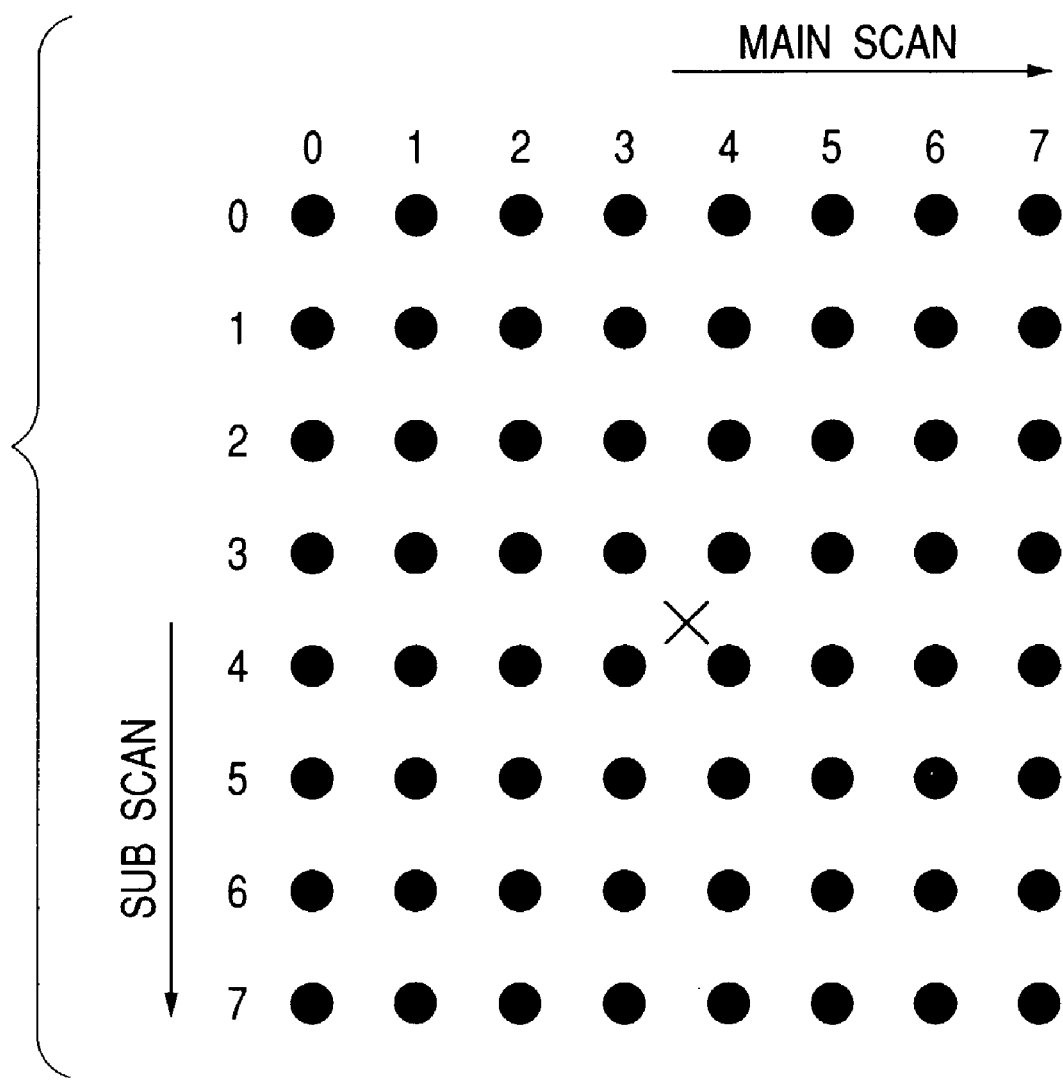
FIG. 4 is a diagram showing the relation of a target (noticeable) pixel and conversion pixels in the binary image magnification change.

FIG. 4 is the diagram showing the target (noticeable) pixel and the pixels positioned in the vicinity of the target pixel on the former image. In FIG. 4, symbol "X" indicates the target pixel, and symbol "●" indicates the pixels on the former image. In the embodiment, only the 8×8 pixels positioned in the vicinity of the target pixel on the former image are used because 8×8 filters are used, and the target pixel "X" is set so as to be always positioned within the pixel range ($3 \leq i < 4$, $3 \leq j < 4$) in the vicinity of the target pixel on the former image. Furthermore, pixel position information ●X and ●Y of the former image output in the address calculation process are set to represent the position satisfying i=3, j=3.

Here, the distance between the target pixel and the former-image pixel positioned in the vicinity of the target pixel is obtained in a main scan direction and sub scan direction independently. In the later-described circuit, the process is first performed in the sub scan direction, and then the process is performed in the main scan direction based on the result of the process in the sub scan direction.

Incidentally, the number of converted pixels (i.e., target pixel) becomes less than the number of former-image pixels by eight pixels or eight lines at both the edges in the main and sub scan directions. Therefore, an edge process is performed after dummy data of eight pixels/eight lines was added to the former image, whereby it is possible not to decrease the number of pixels even after the process was performed.

Figure 5:
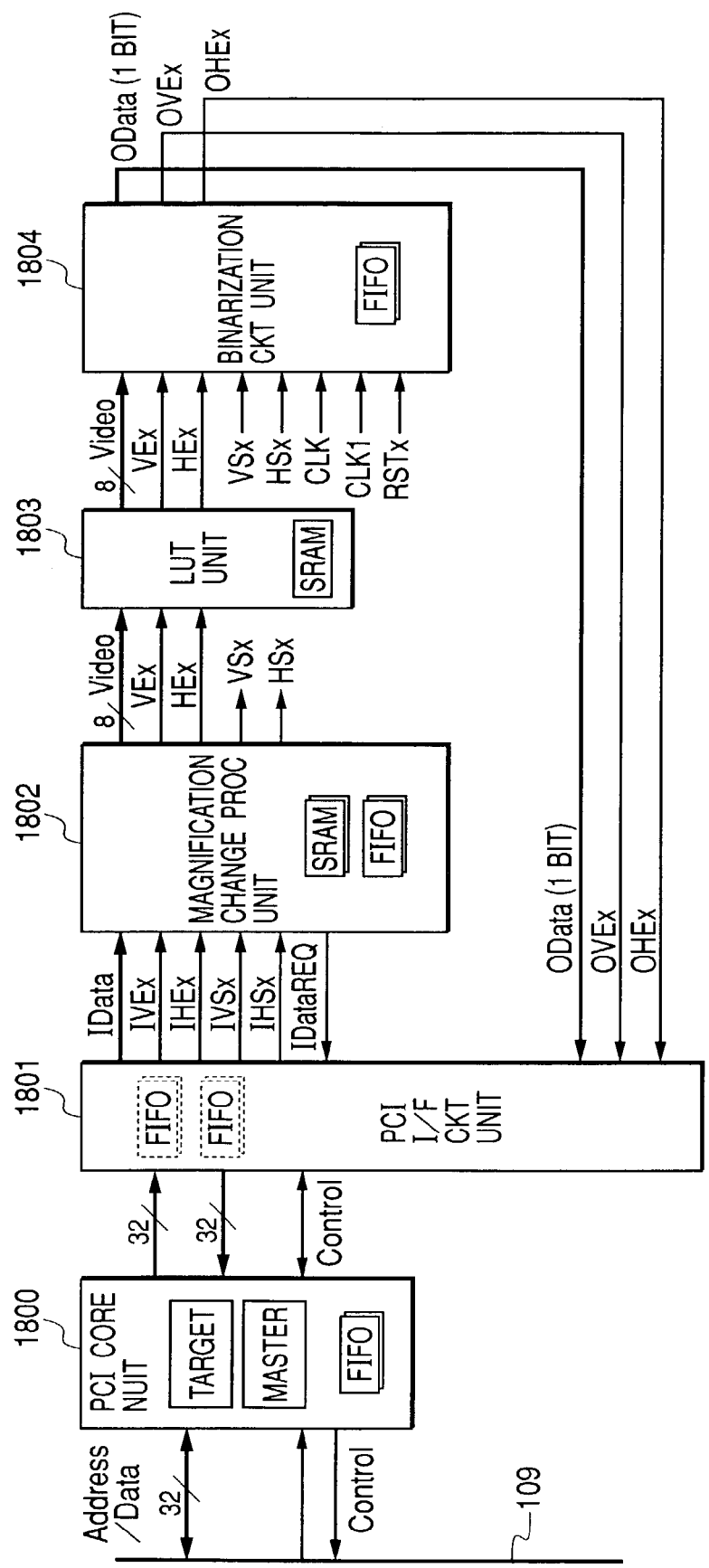
FIG. 5 is a block diagram showing the structure of a binary image magnification change processing unit.

FIG. 5 is a block diagram showing the structure of the binary image magnification change processing unit 180 which acts as one of the function boards on the PCT bus.

A PCI core unit 1800 controls a protocol, timing, a data available width, an error process and the like according to a standard of the PCI bus 109, and corresponds to a target operation and a master operation in the PCI transfer. A PCI I/F circuit unit 1801 is an interface circuit which performs raster conversion of the image data having the 32-bit width transferred from the PCI bus 109 into one-bit data for a later-described magnification change processing unit 1802, and further converts one-bit raster data subjected to the magnification change process by the magnification change processing unit 1802 into the data having the 32-bit width to be transferred to the PCI bus 109. Furthermore, a control circuit which performs timing conversion between the PCI bus 109 and a raster process in a later-stage block and an FIFO memory which is used for line conversion are provided. That is, the PCI I/F circuit unit 1801 has the function to generate raster-converted one-bit image data IData, an enable signal IVEx and a sync signal IVSx in the sub scan direction, and an enable signal IHEx and a sync signal IHSx in the main scan direction, and the function to output the raster data IData based on a data request signal IDataREQ transferred from the magnification change processing unit 1802. Incidentally, it should be noted that the error process according to the present invention is performed within this block. The magnification change processing unit 1802 performs the conversion process to the image data IData at a predetermined magnifying power in response to timing signals in the main scan and sub scan directions sent from the PCI I/F circuit unit 1801. In this block which is achieved by the algorithm already explained with reference to FIGS. 3 and 4, as a matter of convenience, the one-bit image data is once pseudo-converted into the eight-bit image data, the converted image data is subjected to the magnification change process, and then an eight-bit image signal Video is output. Incidentally, an SPAM for storing the FIFO line memory data and the calculation process data are stored is provided within the magnification change processing unit 1802. Then, the eight-bit image signal Video converted by the magnification change processing unit 1802 is output together with image available signals VEx and HEx, and, e.g., density conversion or the like is performed to these signals by a table (consisting of an SRAM) of an LUT unit 1803. Here, it should be noted that the LUT unit 1803 is equivalent to the LUT processing unit 1207 shown in FIG. 3. After then, a binarization circuit unit 1804 performs a binarization process according to a pseudo-halftone process, a screen process and the like. Here, it should be noted that, although a line memory corresponding to several lines is provided within the binarization circuit unit 1804, the explanation of the details thereof will be omitted. Also, it should be noted that the binarization circuit unit 1804 is equivalent to the binarization processing unit 1208 shown in FIG. 3. Then, binarized one-bit image data OData is output together with a main scan available signal OHEx and a sub scan available signal OVEx to the PCI I/F circuit unit 1801, and then converted into the 32-bit image data necessary for the PCI bus 109.

Figure 6:
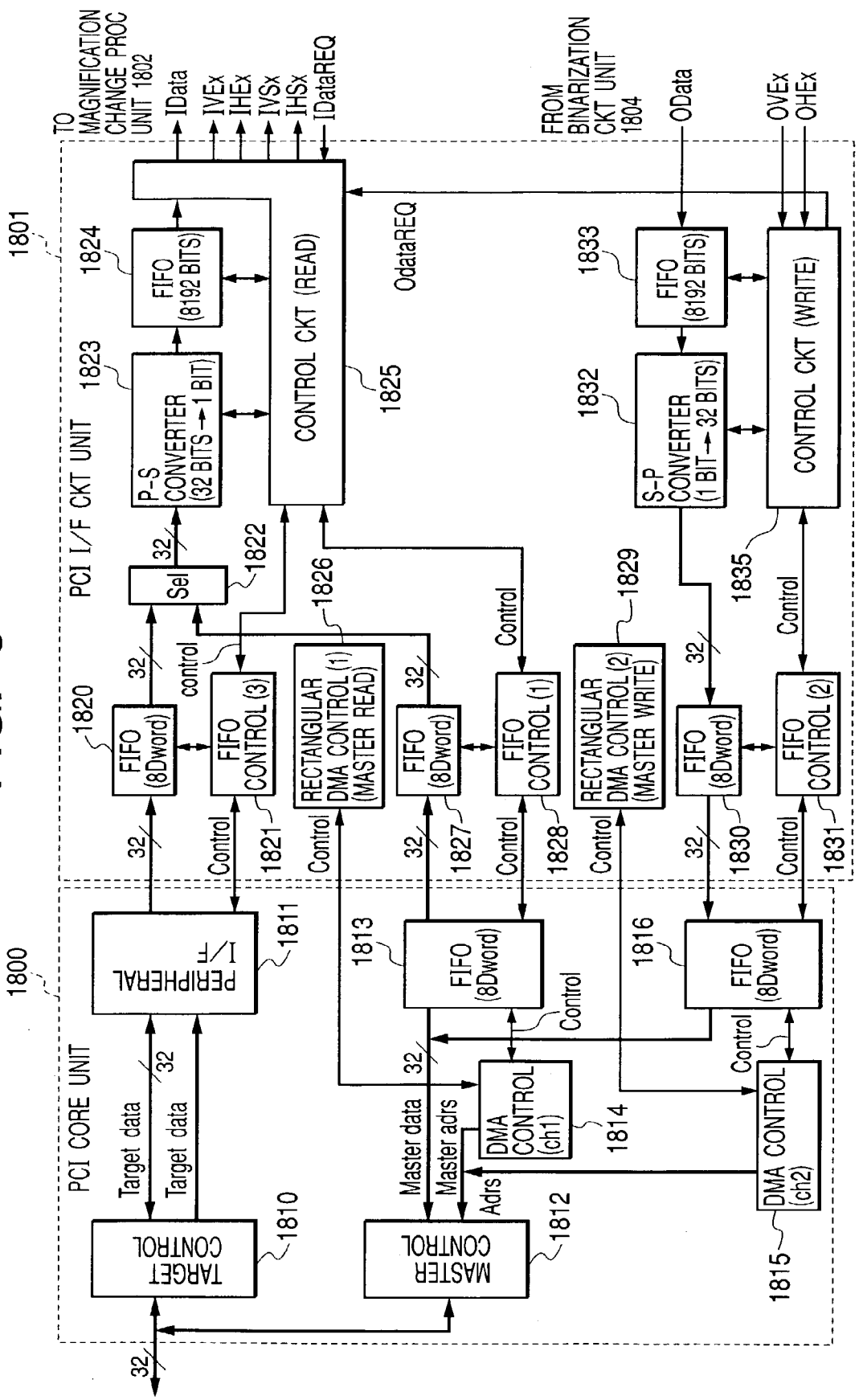
FIG. 6 is a block diagram showing the structures of a PCI core unit 1800 and a PCI interface (I/F) circuit unit 1801 both shown in FIG. 5.
Figure 7:
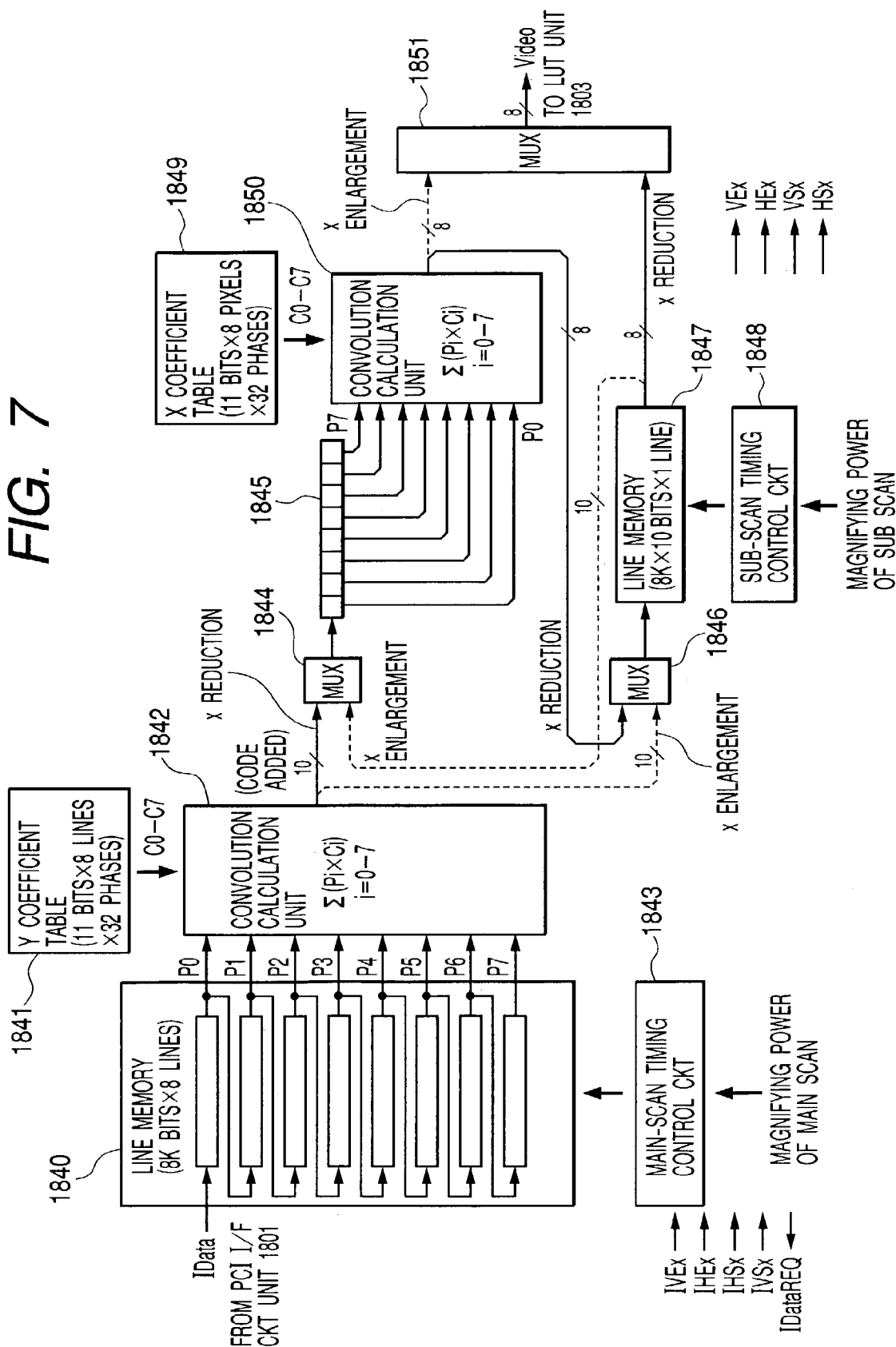
FIG. 7 is a block diagram showing the structure of a magnification change processing unit 1802 shown in FIG. 5.

Next, the operation of the line memory in the binary image magnification change board 180 will be explained with reference to FIGS. 6 and 7. FIG. 6 shows the internal structure of the PCI I/F circuit unit 1801 of FIG. 5, and FIG. 7 shows the internal structure of the magnification change processing unit 1802 of FIG. 5.

In FIG. 6, the PCI core unit 1800 which is called the PCI core to perform bus control between the PCI bus 109 and the binary image magnification change board 180 consists of a DMA control (ch1) 1814 and a DMA control (ch2) 1815 which act as DMA controllers, an FIFO memory 1813 and an FIFO memory 1816 which buffer various data, a Target Control 1810 and a Master Control 1812 which respectively control the DMA control (ch1) 1814 and the DMA control (ch2) 1815, and a Peripheral I/F 1811 which is used for a target operation. Here, the DMA circuits are equipped with two channels so that the binary image magnification change board 180 acts as the master to read and write the image data. Furthermore, the target circuit to which the image data is transferred when the binary image magnification change board 180 acts as the target and the CPU 101 of FIG. 1 acts as the master is equipped with one channel. In such a target operation mode, as well as the image data transfer, the parameter necessary for the magnification change is written in the SRAM provided inside the binary image magnification change board 180, the conversion data is written in the LUT memory, and the data is written in a register for setting an operation mode or the like.

When the data is exchanged on the PCI bus of the binary image magnification change board 180, a burst mode to continuously transfer the 32-bit image data eight times is used, whereby each of the internal FIFO memories 1813 and 1814 has a capacity of eight-double words (hereinafter called 8Dword).

The PCI I/F circuit unit 1801 which performs the raster conversion necessary for the magnification change process in regard to the PCI bus consists of a block for converting a data width, a block for generating the timing signal for the raster process, and a block for performing an error detection process according to the present invention. In the PCI I/F circuit unit 1801, an FIFO memory 1820 which is controlled by an FIFO control (3) 1821 temporarily stores the image data in the target operation. As well as the case of the PCI core unit 1800, the FIFO memory 1820 has a capacity of 8Dword. Furthermore, an FIFO memory 1827 which is controlled by an FIFO control (1) 1828 temporarily stores the data read from the FIFO memory 1813 in the master operation.

Moreover, an FIFO memory 1830 which is controlled by an FIFO control (2) 1831 temporarily stores the magnification-change-processed data to be written in the FIFO memory 1816 in the master operation.

Generally, the DMA transfer on the PCI bus is performed for a continuous address space, and this transfer will be called continuous DMA transfer hereinafter. Since the binary image magnification change process or the like in the embodiment is performed in the form of raster process, it is preferable to be able to perform the DMA transfer not only for the continuous address space but also for a rectangularly cut-out area, and the latter transfer will be called rectangular DMA transfer hereinafter. For this reason, two channels of rectangular DMA control circuits which are used to perform, other than the ordinary continuous DMA transfer, the transfer for predetermined rectangular areas in the master operation are provided. That is, a rectangular DMA control (1) 1826 is used for master reading, and a rectangular DMA control (2) 1829 is used for master writing. The rectangular DMA controls (1) 1826 and (2) 1829 respectively control the head addresses of the DMA control (ch1) 1814 and the DMA control (ch2) 1815 being the DMA control circuits in the PCI core unit 1800 in regard to each line in the PCI transfer, thereby performing rectangular control. By such an operation mode, it is possible to cut out the predetermined rectangular area from the image data stored in the RAM 102, performs the binary image process to the cut-out area, and freely write the processed result at an arbitrary position in the memory.

A selector (Sel) 1822 selects the data of the FIFO memory 1820 being the image data in the target operation or the data of the FIFO memory 1827 being the image data in the master operation, in accordance with the operation mode. A parallel-to-serial conversion circuit 1823 converts the 32-bit image data transferred from the PCI bus into the one-bit image data. The converted one-bit image data is once stored in an FIFO memory 1824 having an 8192-bit capacity, and then the stored data are sequentially transferred to the later-stage magnification change processing unit 1802 in response to the data request signal IDataREQ. Here, the parallel-to-serial conversion circuit 1823 and the FIFO memory 1824 are controlled by a control circuit (read) 1825. By the control circuit 1825, the enable signals IVEx and IHEx and the sync signals IVSx and IHSx are generated, and the dummy data for the edge process is inserted into the data IData. The value of the dummy data can be set to an internal register through the PCI bus, and the value "1" indicating white data is ordinarily set.

A serial-to-parallel conversion circuit 1832 converts the one-bit image data to which the binary image magnification change process has been performed into the 32-bit image data of the data width for the PCI bus. The image data to which the binarization process has been performed is once stored in an FIFO memory 1833 having an 8192-bit capacity, and then transferred to the serial-to-parallel conversion circuit 1832. Here, the serial-to-parallel conversion circuit 1832 and the FIFO memory 1833 are controlled by a control circuit (write) 1835. The control circuit 1835 performs the control in response to the enable signals OVEx and OHEx transferred from the binarization circuit unit 1804, and then transfers the image data to the FIFO memory 1816 through the FIFO memory 1830.

FIG. 7 shows the structure of the magnification change processing unit 1802. As explained in FIG. 4, since the magnification change process is performed through the process for eight lines in the sub scan direction and eight pixels in the main scan direction, whereby the line memories each consisting of a shift register and having the 8192-bit capacity are provided respectively for the eight lines in the magnification change processing unit 1802, so as to store the data of eight pixels. In addition, a line memory of one line is provided for the calculation process in the main scan direction. Since the order of the processes is different between the image reduction and the image enlargement, the width of the FIFO memory is set to have ten bits necessary for the image reduction. Furthermore, if the process in the main scan direction and the process in the sub scan direction are performed simultaneously, a large-capacity memory and a control circuit for the memory are necessary. For this reason, the process in the main scan direction is performed to the result obtained by the process in the sub scan direction, whereby the memory capacity and the circuit scale are saved.

The image data input from the PCI I/F circuit unit 1801 is written in a line memory 1840 having a capacity corresponding to eight lines, a line shift process is sequentially performed to the lines in the line memory 1840, and then outputs P0 to P7 respectively corresponding to the eight lines are output.

A main-scan timing control circuit 1843 generate timing for the process in the sub scan direction, on the basis of setting of a main-scan magnifying power and various timing signals. Besides, numeral 1841 denotes a Y coefficient table which is equivalent to the coefficient calculation processing unit 1204 shown in FIG. 3. In the Y coefficient table 1841, necessary coefficient data has been previously written in an SRAM through the PCI bus. In this case, the coefficient data of the 11-bit width is divided into the data of eight lines and 32 phases and then stored. A convolution calculation unit 1842 is a block which is equivalent to the digital filter processing unit 1206 shown in FIG. 3, and performs convolution calculation of the one-bit image data P0 to P7 input from the eight-line line memory 1840 and 11-bit coefficient data C0 to C7 read from the Y coefficient table 1841. As a result, code-added ten-bit data is output from the convolution calculation unit 1842, and then the calculation in the main scan direction is performed after the calculation in the sub scan direction. In the calculation in the main scan direction, the order of processes differs according to the magnifying power. That is, in the calculation for reduction, since the processed data amount is smaller than the former data amount, it is controlled to first perform the convolution calculation, once store the calculated data in a line memory 1847, and then output only the available image data. On the other hand, in the calculation for enlargement, since the processed data amount is larger than the former data amount, it is controlled to first write the data in the line memory 1847, and perform the convolution calculation after controlling the reading of the former image data. Thus, by changing the order of processes according to the magnifying power, it is possible to always output only the available data to the later-stage processing block.

A multiplexer (MUX) 1844 selects the data read from the convolution calculation unit 1842 in the image reduction and selects the data read from the line memory 1847 in the image enlargement. The output data from the MUX 1844 is then input to a shift register 1845 which consists of an eight-stage flip-flop circuit, and bit shift is performed in the main scan direction. Besides, numeral 1849 denotes an X coefficient table in which coefficient data according to the magnifying power has been previously written through the PCI bus, as well as the Y coefficient table 1841. Incidentally, the memory capacity of the X coefficient table 1849 is the same as that of the Y coefficient table 1841. Also, a convolution calculation unit 1850 is provided to perform the convolution calculation of the image data P0 to P7 input from the shift register 1845 and the coefficient data C0 to C7 read from the X coefficient table 1849. Then, in case of enlarging the image, the convolution-calculated data is output as the eight-bit image data through a multiplexer (MUX) 1851. On one hand, a multiplexer (MUX) 1846 selects the data read from the convolution calculation unit 1842 in the image enlargement and selects the data read from the convolution calculation unit 1850 in the image reduction, and then transfers the selected data to the line memory 1847. The line memory 1847 outputs the read data to the MUX 1844 in the image enlargement, and outputs the read data to the MUX 1851 in the image reduction. Also, the calculation in the main scan direction is controlled by a sub-scan timing control circuit 1848. The sub-scan timing control circuit 1848 operates under the control based on the magnifying power in the sub scan direction, and transfers the timing signals to the line memory 1847, the shift register 1845 and the like. Also, the sub-scan timing control circuit 1848 outputs an available signal, a timing signal such as a sync signal, and the like to the later-stage block. As above, in the magnification change processing unit 1802, the process in regard to each line is performed by using the FIFO memory being the line memory.

Figure 8B:
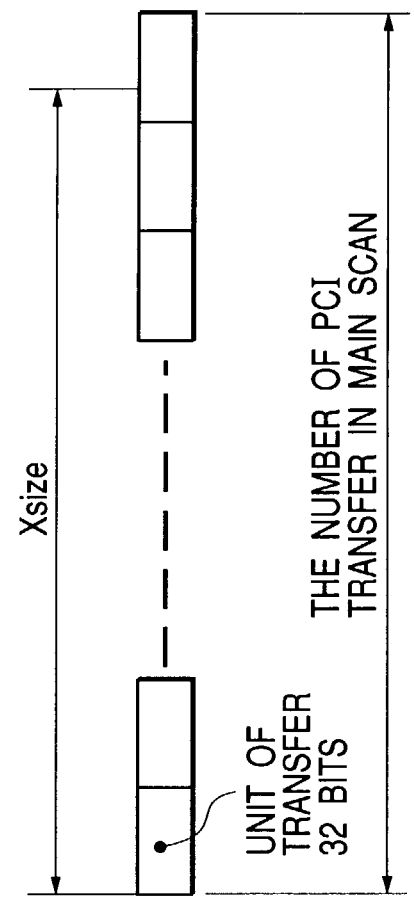
FIGS. 8A and 8B are diagrams showing a memory state of a former image in continuous DMA (direct memory access) transfer.
Figure 8A:
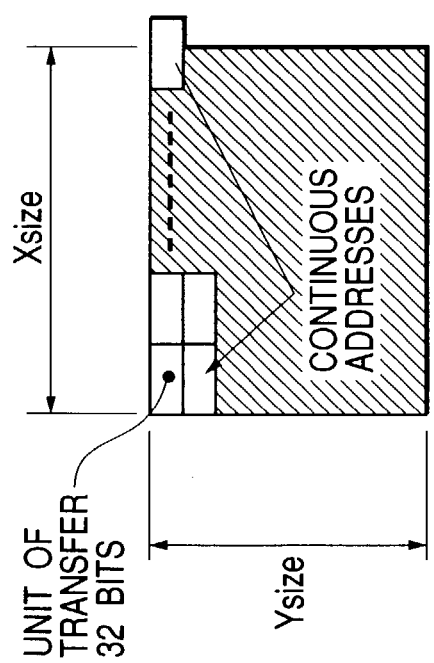
Figure 9A:
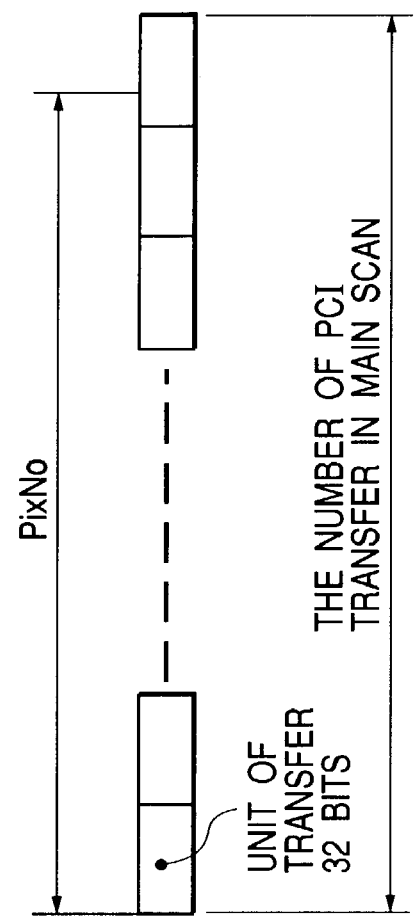
FIGS. 9A and 9B are diagrams showing a memory state after the process in the continuous DMA transfer.
Figure 9B:
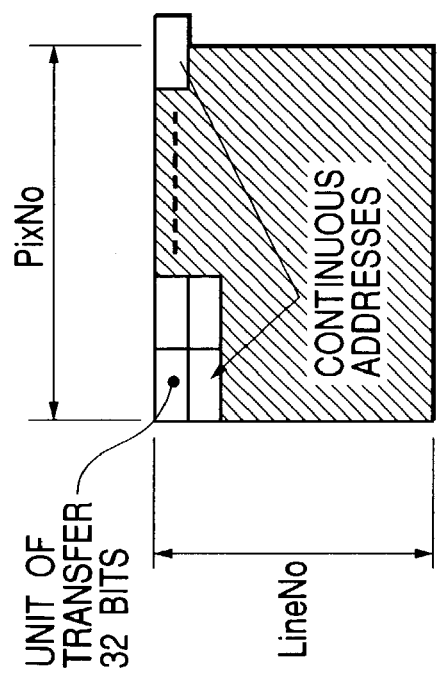

The relation of the RAM 102 at a time of former image reading (master read) in the continuous DMA transfer is shown in FIGS. 8A and 8B, and the relation of the RAM 102 at a time of processed result writing (master write) in the continuous DMA transfer is shown in FIGS. 9A and 9B. Here, the address of the RAM 102 in case of FIGS. 8A and 8B and the address of the RAM 102 in case of FIGS. 9A and 9B are set respectively in different address areas so that these addresses do not overlap. Furthermore, a memory space of the hatching portion constitutes continuous addresses.

In FIGS. 8A and 8B, symbol Xsize denotes the number of pixels of the former image in the main scan direction, and symbol Ysize denotes the number of lines in the sub scan direction. In FIGS. 9A and 9B, symbol PixNo denotes the number of pixels of the processed image in the main scan direction, and symbol LineNo denotes the number of lines in the sub scan direction. Here, it should be noted that these numbers satisfy:

PixNo=$X$size×magnifying power in the main scan direction

LineNo=$Y$size×magnifying power in the sub scan direction

It should be noted that the number of PCI transfer (the number of one-time transfer is 32 bits) in the continuous DMA transfer is set by multiplying the number of main-scan PCI transfer and the number of lines together. Incidentally, the unit of transfer in a PCI path is 32 bits, and the number of data in the main scan direction is handled in regard to each pixel (one bit). Therefore, in case of the last main-scan transfer of which the number of transfer data is less than 32 bits, compensation is performed by dummy data of 0 or 1, and then the transfer is performed.

Figure 10B:
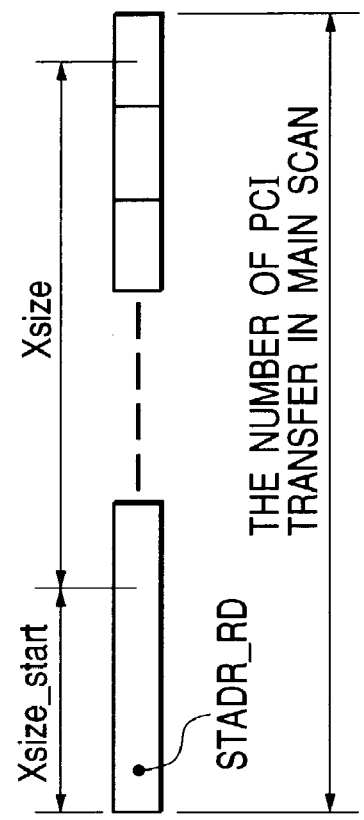
FIGS. 10A and 10B are diagrams showing a memory state of a former image in rectangular DMA transfer.
Figure 10A:
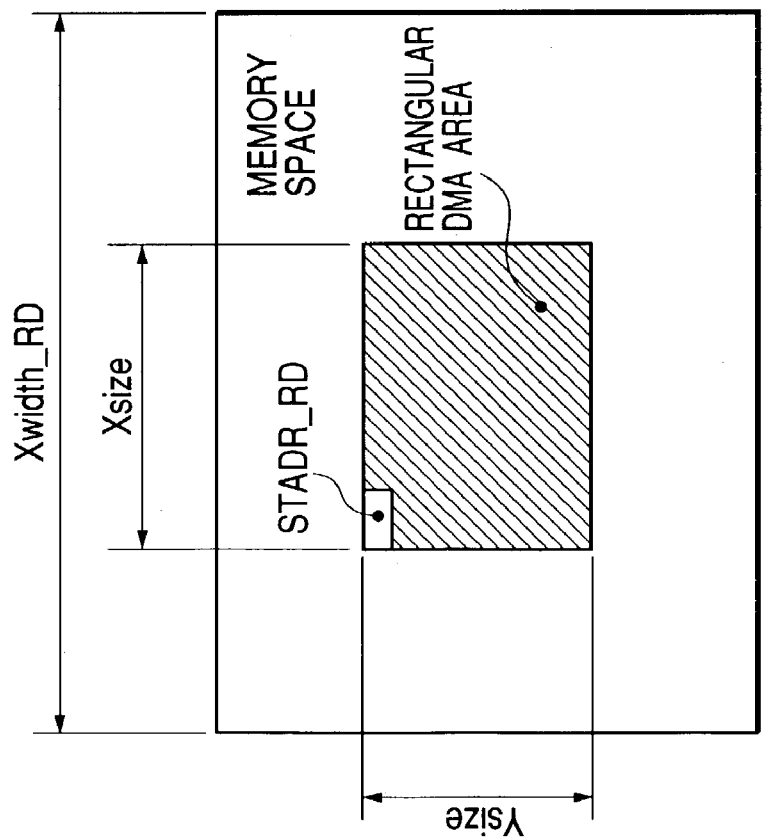

The relation of the RAM 102 at a time of former image reading (master read) in the rectangular DMA transfer is shown in FIGS. 10A and 10B, and the relation of the RAM 102 at a time of processed result writing (master write) in the rectangular DMA transfer is shown in FIGS. 11A and 11B. Here, the address of the RAM 102 in case of FIGS. 10A and 10B and the address of the RAM 102 in case of FIGS. 11A and 11B are set respectively in different address areas so that these addresses do not overlap. Furthermore, a memory space of the hatching area is the area which is rectangularly cut out from a continuous memory space.

In FIGS. 10A and 10B, symbol Xwidth_RD denotes the main-scan width (each consisting of 32 bits) of the memory area in which the former image is stored, symbol STADR_RD denotes the head address of the memory area from which the data is read, symbol Xsize denotes the number of pixels of the former image in the main scan direction, and symbol Ysize denotes the number of lines in the sub scan direction. Furthermore, symbol Xsize_start denotes the value for designating to which bit from the head of the 32-bit data at the address STADR_RD the rectangular process should be performed. It is possible by setting this value to achieve the designation in regard to each pixel in the rectangular area. In FIGS. 11A and 11B, symbol Xwidth_WR denotes the main-scan width (each consisting of 32 bits) of the memory area in which the processed image is stored, symbol STADR_WR denotes the head address of the memory area to which the data is written, symbol PixNo denotes the number of pixels of the processed image in the main scan direction, and symbol LineNo denotes the number of lines in the sub scan direction. Here, it should be noted that these parameters satisfy:

PixNo=$X$size×magnifying power in the main scan direction

LineNo=$Y$size×magnifying power in the sub scan direction head address of the next line=STADR_RD+ Width_RD head address of the next line=STADR_WR+ Width_WR It should be noted that the number of PCI transfer (the number of one-time transfer is 32 bits) in the rectangular DMA transfer is set by the number of main-scan PCI transfer. If the data transfer of one line is performed in the main scan direction by the control circuits of the rectangular DMA control (1) 1826 and the rectangular DMA control (2) 1829 both shown in FIG. 6, then the head address of the memory corresponding to a next line is designated, and the predetermined transfer is performed in similar manner. Incidentally, the unit of transfer in the PCI path is 32 bits, and the number of data in the main scan direction is handled in regard to each pixel (one bit). Therefore, in case of the last main-scan transfer of which the number of transfer data is less than 32 bits, compensation is performed by dummy data of 0 or 1, and then the transfer is performed.

As described above, the 32-bit image signal input from the PCI bus is converted into the one-bit serial signal by the PCI I/F circuit unit 1801 shown in FIG. 5, and at the same time the timing signal for the binary magnification change process is raster-converted into the sync signal IHSx. Here, it is necessary to change the period of the sync signal IHSx in accordance with the value of the internal register set through the PCI bus according to the magnifying power in the main scan direction.

Figure 12:
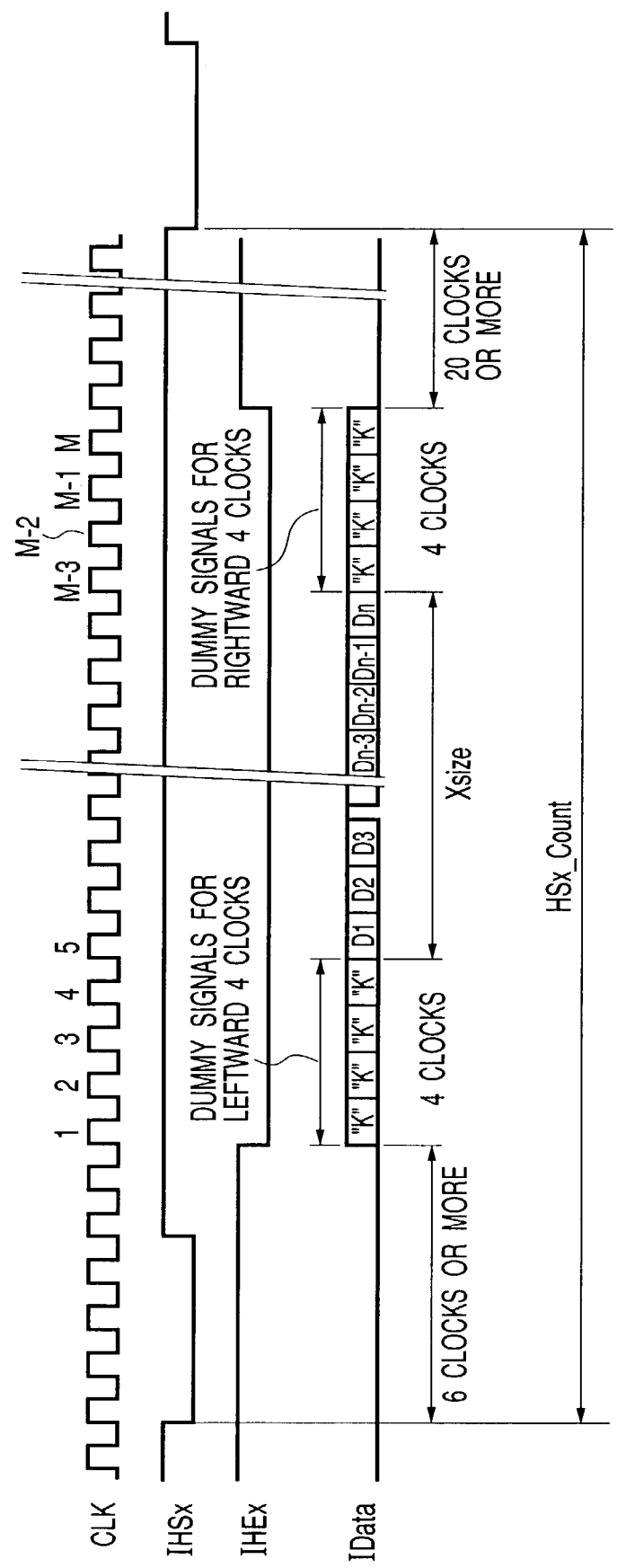
FIG. 12 is a timing chart showing a main scan sync signal and timing signals concerning the main scan sync signal.

Next, the period of the sync signal IHSx in the main scan direction, which is output from the PCI I/F circuit unit 1801, will be explained with reference to FIG. 12. The period of the sync signal IHSx is set by the internal register (hereinafter called HSx_Count) according to the following rule. When the magnifying power is set to "same size" or "reduction", the number of the processed data in the main scan direction does not increase as compared with the number of the former data, whereby the period of the sync signal IHSx is set based on the number Xsize of pixels of the former image in the main scan direction. On the other hand, when the magnifying power is set to "enlargement", the period of the sync signal IHSx is set based on the number PixNo of the pixels of the processed image in the main scan direction (=Xsize×magnifying power in the main scan direction).

When the magnifying power is set to "same size"/"reduction", HSx_Count=6+(Xsize+8)+20 or more is set. Furthermore, when the magnifying power is set to "enlargement", HSx_Count=6+PixNo+20 or more is set. In the last terms of these equations, the value "20" indicates delay amounts of the processes in the LUT unit 1803 and the binarization circuit unit 1804. In FIG. 12, the four pixels of each of the front and back ends of the enable pixel area correspond the dummy signals in case of performing the edge process in the binary image magnification change process, and, in the PCI I/F circuit unit 1801 of FIG. 5, these signals are automatically inserted into the former image input from the PCI bus.

The main-scan enable signal IHEx is the signal representing the enable width of the former image, and the signal obtained by adding the dummy signals of eight clocks to the number Xsize of the main-scan pixels is output at the L level as representing the enable interval.

Figure 13:
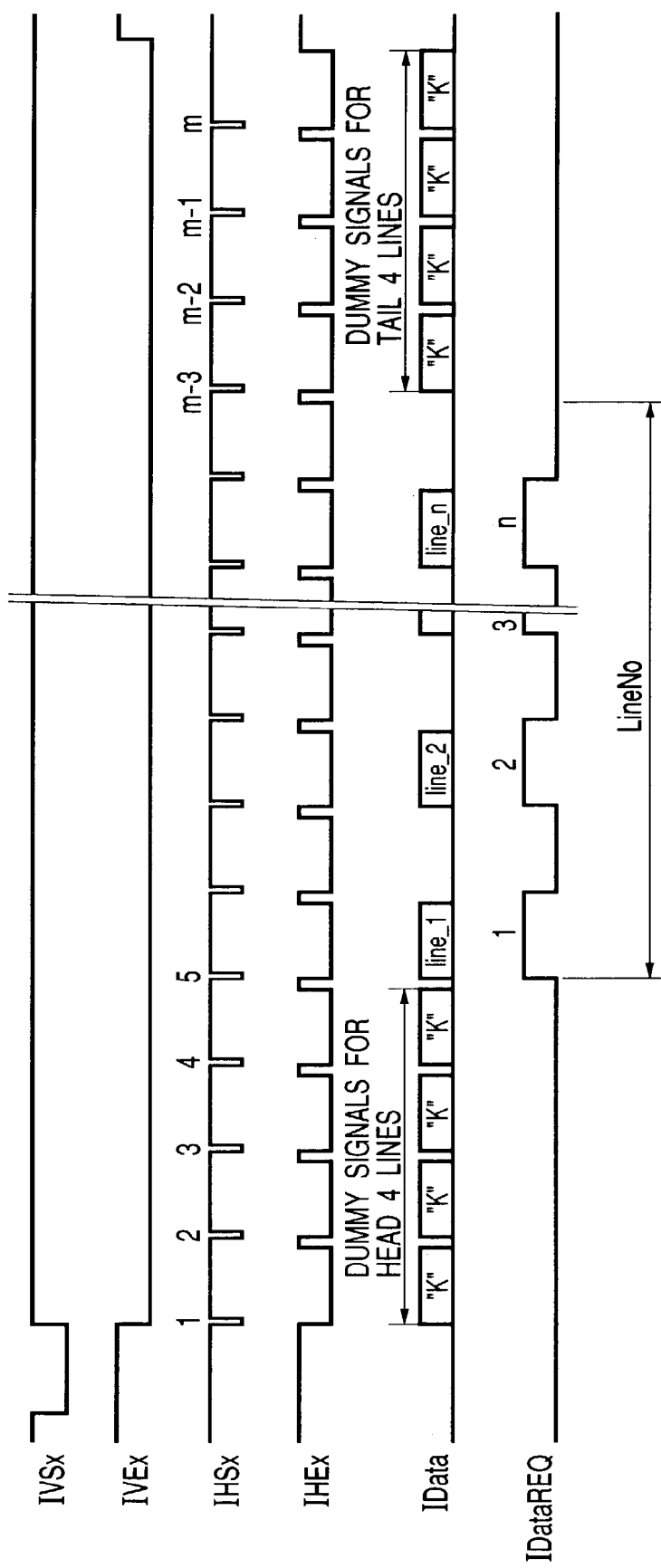
FIG. 13 is a timing chart showing a sub scan sync signal and timing signals concerning the sub scan sync signal.

Then, the sync signal IVSx in the sub scan direction and other signals will be explained with reference to FIG. 13. The sub-scan sync signal IVSx is first output once in regard to one page of the image. Symbol IData denotes the image signal in regard to each line, and the dummy signals of four lines necessary for the edge process are output to the front (head) and back (tail) ends of this signal.

Symbol IDataREQ denotes a signal for requesting data output from the magnification change processing unit 1802 to the PCI I/F circuit unit 1801, and the signal IDataREQ is generated according to a magnifying power by a timing generation circuit in the magnification change processing unit 1802. In FIG. 13, the image signal IData of the former image is restricted to be output in regard to each line, so as to enlarge the image to 200% in the sub scan direction. That is, the enlargement data is calculated by using a period of time that the image signal IData is not output, and then the calculated data is transferred to the blocks after the later-stage LUT unit 1803.

The signal IDataREQ represents the data output request by its H level and the data output inhibition by its L level. When the magnifying power is set to "same size" or "reduction", the former image is output as it is. Alternatively, the signal IDataREQ of H level is always output from all the former images so as to calculate the reduction image data.

The signal IVEx is the image enable signal in the sub scan direction, and the enable signal IVEx obtained by adding the dummy signals of eight clocks to the number Xsize of the enlarged lines is output at the L level as representing the enable interval.

Figure 14:
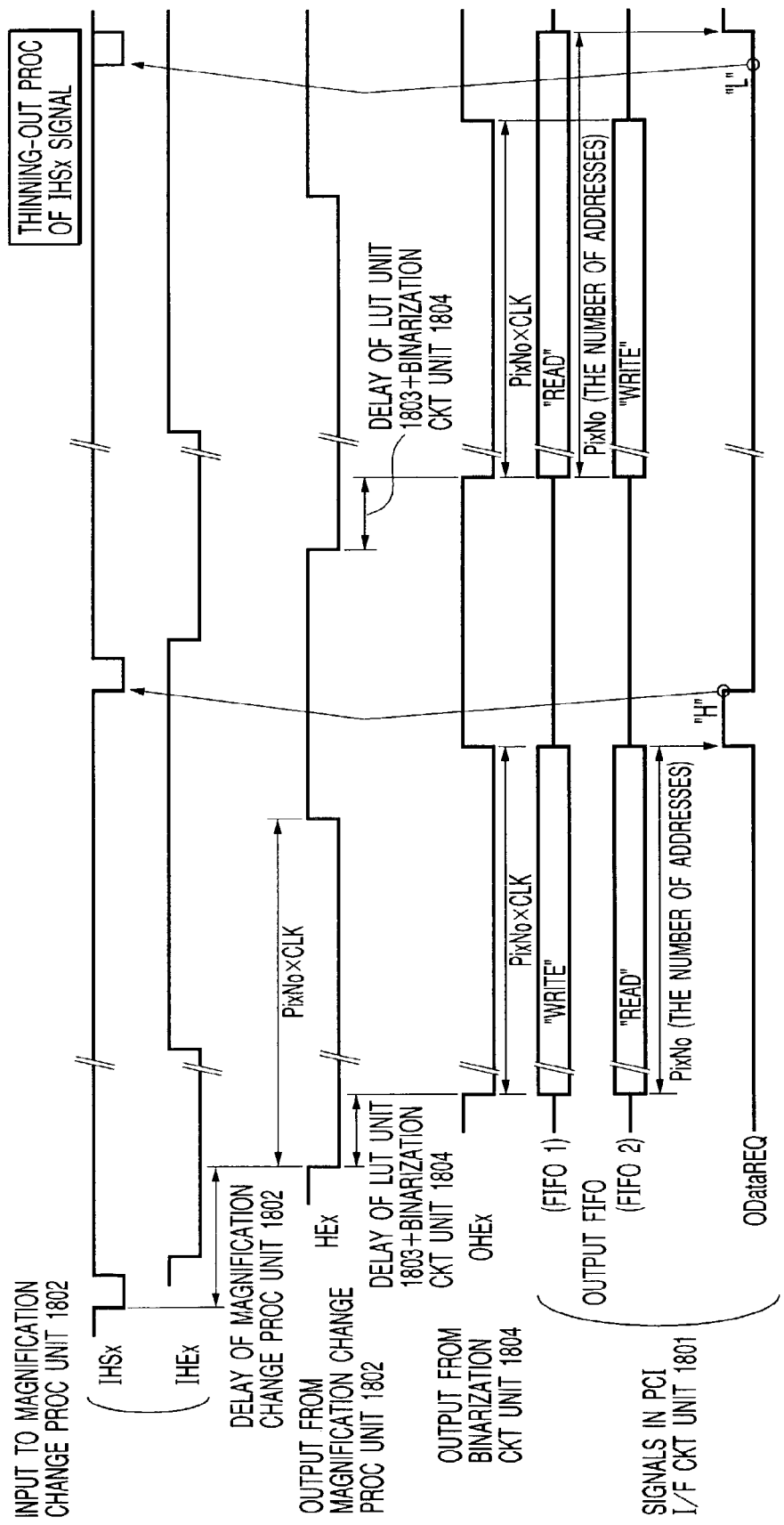
FIG. 14 is a timing chart showing error detection timing and an error detection principle.

FIG. 14 shows error detection timing in case of transferring the image processed result to the PCI bus 109. In the embodiment, as the error detection in the binary image magnification change board 180, there are the following two kinds of error detection operations in addition to the error detection concerning the PCI bus.

In these error detection operations, overwriting of the data is inhibited even if the operation speed of the PCI bus is lowered because the binary image magnification change board 180 merely has the line memory such as an FIFO memory or the like, and an error signal is generated after a predetermined time or longer (i.e., line counting) elapsed. Furthermore, an interruption INTA# is output when the interruption is permitted on the PCI bus.

(1) In a case where data cannot be received from the PCI bus within a predetermined time when data is output to the PCI bus 109

In this case, a predetermined number of lines for detecting an error is set in the register. Here, the predetermined number of lines corresponds to the number of lines when it is assumed that the period of the sync signal IHSx in the main scan direction of FIG. 5 is set as one line. Then, the optimum number of lines for detecting the error is set according to the performance of the used PCI bus. For example, this number may be small if the performance of the PCI bus is high. Then, if the time of no response from the PCI bus exceeds the line count value, an interruption factor register is set to 1.

Further, the interruption INTA# is output if an interruption permission bit is 1.

(2) In a case where data is not input from the PCI bus within a predetermined time when data is input from the PCI bus 109

As well as the above, in this case, a predetermined number of lines for detecting an error is set in the register. Then, if the time of no response from the PCI bus exceeds the line count value, the interruption factor register is set to 1.

Further, the interruption INTA# is output if an interruption permission bit is 1.

Hereinafter, the principle of the error detection operation will be explained based on, as an example, the above case (1) that the processed data is written through the PCI bus. Here, it should be noted that the above principle is also applicable to the above case (2).

When the sync signal IHSx in the main scan direction requested by the magnification change processing unit 1802 is generated at a predetermined period, the level of a signal ODataREQ is detected. Then, when the signal ODataREQ is H level at the timing of outputting the sync signal IHSx, the sync signal IHSx is output (L level). On the other hand, when the signal ODataREQ is L level, the sync signal IHSx is not output (H level). Next, the signal ODataREQ is again checked at the timing of outputting the sync signal IHSx, and the process for thinning out the sync signal IHSx is performed until the signal ODataREQ becomes available. However, in FIG. 14, even in the case where the sync signal IHSx is thinned out, the main-scan sync signal IHSx in such a period of time is output once at least.

(i) The signal ODataREQ is generated according to the state of the output FIFO memory (double-buffer system is assumed) for transferring the output data OData of the binarization circuit unit 1804 to the PCI I/F circuit unit 1801.

(ii) It is permitted to output the main-scan sync signal IHSx of the next line under the condition that the output of all the data on the read side of the output FIFO memory (the output side to the PCI I/F circuit unit 1801) completes.

(iii) Actually, it only has to observe the read address of the output FIFO memory (or empty information on the read side) and then make the signal ODataREQ true at the last address of the line in question.

(iv) Even at the timing of essentially outputting the main-scan sync signal IHSx, the main-scan sync signal IHSx is not output if the signal ODataREQ is false (break of the output until timing of the next line comes).

(v) When the signal ODataREQ does not become true even after waiting for a predetermined line period of time (it is impossible to output the main-scan sync signal IHSx), it is considered that an error occurs.

(vi) The number of the lines considered in the above state (v) that the error occurs is set by the internal register.

The interruption INTA# on the PCI bus is subjected to a logical OR operation together with an error factor on the PCI bus and then output by the interruption factor register.

As explained above, according to the embodiment, in the case where the raster conversion is performed by the image processing board connected to the PCI bus, even if the data on the PCI bus cannot be input or output, it is controlled not to output the sync signal used for the process of the line memory. Thus, even when the PCI bus is occupied by other PCI board connected on this PCI bus, it is possible to prevent that the overflow of the line memory occurs.

Furthermore, in the case where it is impossible to access the PCI bus even after elapsing the predetermined period of time, the error signal is generated so as to stop the process of the image processing board, whereby the stable operation can be achieved for the entire system.

In the embodiment, the PCI bus is explained by way of example. However, according to the present invention, the same effect as above can be obtained even in a time-divisional bus, other general-purpose bus having a shared memory, or an independent bus.

In the embodiment, the case where the data of 32-bit width on the PCI bus is raster-converted into the data of one-bit width is explained. However, the present invention is not limited to these bit widths, that is, the same effect as in the embodiment can be obtained in a case where the process is performed only by using a line memory (without using any page memory).

As explained above, according to the embodiment, in the case where the line memory is used after the raster conversion was performed in the image processing unit (board) connected to the PCI bus, if the data cannot be input or output between this unit (board) and the PCI bus, it is controlled not to output the sync signal for processing the line memory. Thus, even if the PCI bus is occupied by other PCI board connected on this PCI bus, it is possible to prevent that the overflow of the line memory occurs, and it is also possible to achieve the process only by using the line memory.

Furthermore, in the case where it is impossible to access the PCI bus even after elapsing the predetermined period of time, the error signal is generated so as to stop the process of the image processing unit, whereby the stable operation can be achieved for the entire system.

It is to be understood that the phraseology or terminology employed herein is for the purpose of description and not of limitation. While the invention has been described with reference to the structure disclosed herein, it is not confined to the details set forth and this application is intended to cover such modifications or changes as may come within the purposes of the improvements or the scope of the following claims.

What is claimed is:

1. An image processing apparatus comprising:
a memory unit storing image data; and
an image processing unit, connected to said memory unit through a general-purpose bus, performing image processing on image data transmitted to the image processing unit via the general-purpose bus;
wherein said image processing unit comprises:
a first memory portion storing image data transmitted from the memory unit;
a magnification change processing portion performing magnification change processing on image data transmitted from said first memory portion;
a generating portion generating a sync signal at a predetermined period, wherein the sync signal is used to transmit image data from said first memory portion to said magnification change processing portion;
a second memory portion storing image data on which image processing is performed by an image processing portion;
an outputting portion outputting image data stored in said second memory portion to the general-purpose bus; and
a control portion controlling the generating portion so that the predetermined period of the sync signal generated in a case where said magnification change processing portion performs enlargement processing is longer than the predetermined period of the sync signal generated in a case where said magnification change processing portion performs a reduction processing, wherein said control portion controls the generating portion to generate the sync signal in a case where image data to be transmitted from said second memory portion to said outputting portion does not exist, and controls the generating portion not to generate the sync signal in a case where image data to be transmitted from said second memory portion to said outputting portion does exist.

2. An image processing apparatus according to claim 1, wherein said control portion measures a period of time that the sync signal used to transmit image data to said magnification change processing portion is not generated, and outputs an error signal in a case where the measured period of time exceeds a predetermined period of time.

* * * * *